Dec. 16, 1930. A. R. THOMPSON ET AL 1,785,019
FRUIT PITTER
Filed Oct. 1, 1927
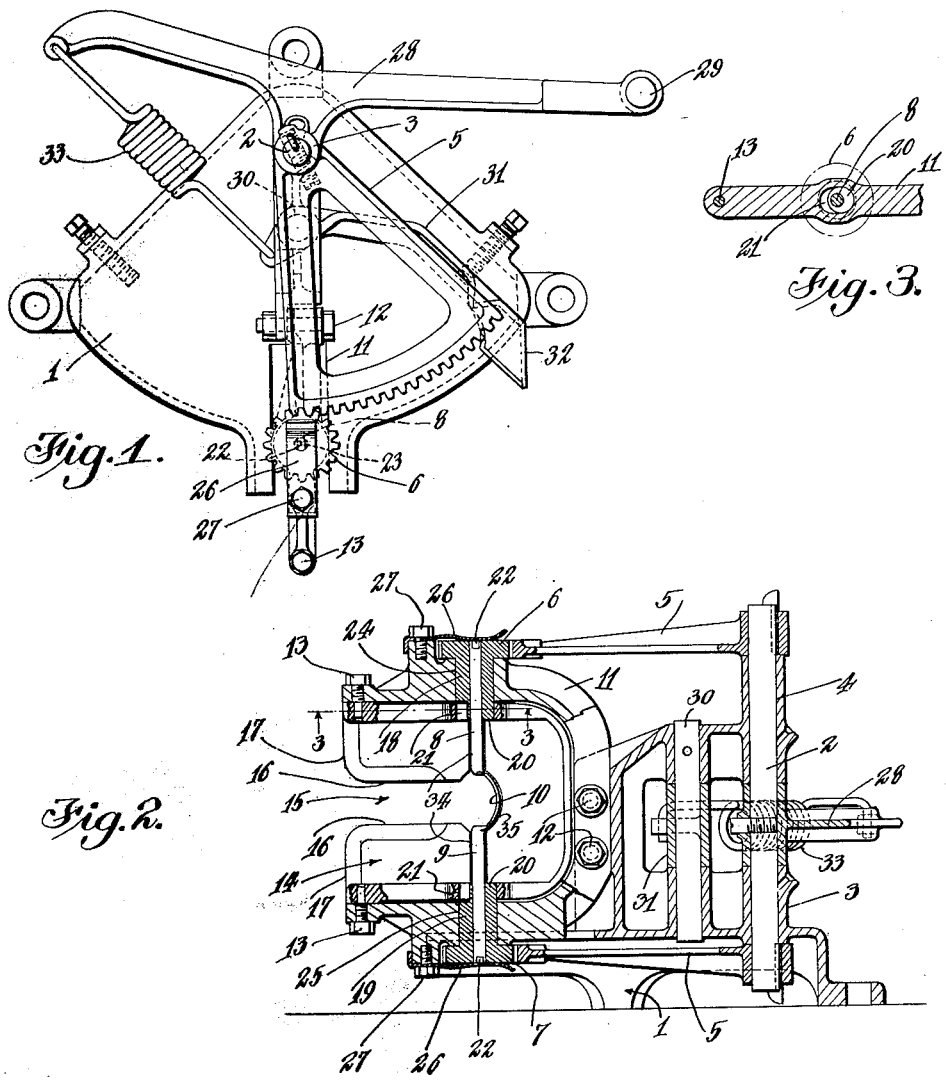
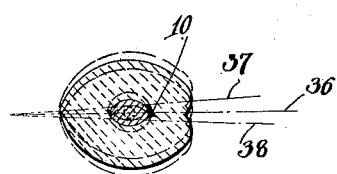
Inventor
Albert R. Thompson
Earl R. Anderson
By Lyon & Lyon
Attorneys Patented Dec. 16, 1930

1,785,019

UNITED STATES PATENT OFFICE

ALBERT R. THOMPSON, OF SAN JOSE, AND EARL R. ANDERSON, OF LOS ANGELES, CALIFORNIA, ASSIGNORS TO PACIFIC MACHINERY COMPANY, OF SAN FRANCISCO, CALIFORNIA, A CORPORATION OF CALIFORNIA

FRUIT PITTER

Application filed October 1, 1927. Serial No. 223,336.

This invention relates to fruit pitters, and is more particularly related to a device for removing the pits from fruit in such a manner as to cut around the pit a shallow cut in the flesh of the fruit to remove a minimum of the flesh of the fruit with the pit.

In the removing of pits or stones from fruit, particularly clingstone peaches, having a rough pit with a fin which extends around the pit, it is essential that the pitter operate to remove all of the pit and the fin thereof; also that the pitter remove the flesh of the fruit around the pit which is known as the "red center" in order to produce a clean cut. It is also essential that the device operate to remove a minimum of the flesh of the fruit in order to avoid the formation of what is known as "shells" which break down in cooking.

It is, therefore, an object of this invention to provide a device for halving and removing the pits from the fruit, including means for pitting the fruit, and means for shifting the fruit during the pitting thereof in such a manner as to cause the pitting means to pass closely around the pit during the operation thereof.

Another object of this invention is to provide a fruit pitter including a curved pitting knife having an operating shaft and means for rotating the shaft, the shaft being removably secured in position so as to enable the same to be removed in a minimum of time as the commercial operation of a pitting device depends upon the rapidity with which the same may be operated, and the pitting knife employed must be of a relatively thin construction which readily breaks should the same hang up on the pit of the fruit during the pitting operation.

Another object of this invention is to provide a fruit pitter includng means for removing the pit from the fruit including a curved pitting knife, means for holding the fruit during the operation of the curved pitting knife, and means for shifting the holding means relative to the pitting knife during the actuation of the same so that the fruit pit is moved close to the pitting knife during the actuation of the same to form in the halves of the fruit a shallow cut.

Other objects and advantages of this invention it is believed will be apparent from the following detailed description of a preferred embodiment thereof, as illustrated in the accompanying drawings.

In the drawings:

Figure 1 is a top plan view of a fruit pitter embodying this invention.

Figure 2 is a side elevation mainly in vertical mid-section thereof.

Figure 3 is a sectional view taken substantially on the line 3—3 of Figure 2.

Figure 4 is a diagrammatic view illustrating the travel of the fruit and fruit pit during the rotation of the curved pitting knife.

In the preferred embodiment of this invention, illustrated in the accompanying drawings, 1 illustrates the base adapted to be mounted on any suitable form of support such, for example, as a table. A shaft 2 is journaled in the frame structure 3, as illustrated at 4. Secured to the ends of the shaft 2 are gear segments 5 which mesh with pinions 6 and 7 at the upper and lower ends of the frame structure. The pinions 6 and 7 are removably secured to the ends of the shanks 8 and 9 of a curved pitting knife 10. A yoke 11 is secured to the frame 3 by means of bolts 12. Pivotally secured by means of pins 13 to the yoke 11 is an impaling blade 14 by means of which the fruit is impaled and halved. The impaling blade 14 is provided with a pit passage 15 intermediate the sharpened edges 16 by means of which the flesh of the fruit is severed. The forward edges of the impaling blade the sharpened, as illustrated at 17. The pinions 6 and 7 or rather the hubs 18 and 19 thereof are formed eccentrically at the adjacent ends thereof, as illustrated at 20 and fit within elongated slots 21 formed in the edges of the impaling blade 14.

Means are provided for releasably securing the pinions 6 and 7 to the shanks 8 and 9 of the curved pitting knife 10, which means are preferably of the following construction:

The shanks 8 and 9 are flattened at their ends, as illustrated at 22, to fit within slots 23 formed through the ends of the pinions 6 and 7 respectively so that the shanks 8 and 9 and pinions 6 and 7 are held from relative rotation. The hubs 18 and 19 of the pinions 6 and 7 are journaled in bearings 24 and 25 formed within the yoke 11. Spring members 26 are provided for yieldably holding the pinions 6 and 7 in position so that the flattened portions 22 of the shanks 8 and 9 are engaged within the slots 23.

The springs 26 are releasably held in position by means of screws 27 which are screw-threaded into the yoke 11. The enlarged passage-way formed through the yoke 11 within which the hub 18 of the pinion 6 fits permits the curved knife 10 to be readily drawn out of the device when the pinion 6 is removed by raising the spring member 26 upwardly and rotating the same from position to permit the pinion 6 to be lifted from the device. When the pinion 6 is removed, the operator by gripping the shank 8 of the curved pitting knife may easily and quickly remove the same and replace the pitting knife 10 with a new pitting knife by merely placing the pinion 6 back in position so that the flattened portion of the shank 8 is engaged within the slot 23 of the pinion 6 and rotating the spring 26 back to the engaging position, the device is again ready to operate when the pitting knife 10 has broken or has become so dulled as to require a new knife.

In order to rotate the gear segments 5 to rotate the curved pitting knife around the pit of the fruit, an operating lever 28 is provided which is secured to the shaft 2 and is provided with a handle 29. Journaled in the frame 3 is a shaft 30 upon which is secured an arm 31 upon the end of which is provided a holding cup 32 for holding the fruit on the impaling blade during the rotation of the curved pitting knife 10. The arm 31 is operatively connected to the lever 28 by means of a spring 33 so that when the lever 28 is actuated to actuate the curved pitting knife 10, the cup 32 is immediately moved into position to yieldably hold the fruit on the impaling blade 14.

The shanks 8 and 9 of the curved pitting knife 10 extend through open slots 34 formed in the impaling blade 14 and the curved portion of the knife 10 fits within a pit receiving recess 35 formed in the impaling blade 14 at the end of the pit passage-way 15. At the starting position the curved portion of the knife lies against the back edge of the impaling blade 14, as illustrated in Figure 2. In order that the impaling blade 14 may be formed of a minimum width and in order to prevent the knife shanks 8 and 9 becoming stuck in position to prevent their rotation, the open slots 34 through the impaling blade are provided. In the pitting of fruit with a curved pitting knife, such as is illustrated at 10, it often occurs that the curved portion of the pitting knife engages the pit and unless the knife is permitted to flex, results in the breaking of the knife. In accordance with this invention, therefore, the curved pitting knife is supported only at its ends by the support for the pinions 6 and 7, permitting the shanks 8 and 9 of the curved pitting knife to flex in the open slots 34 should the knife engage a portion of the pit.

Referring to Figure 4, the fruit is impaled upon the impaling blade 14 along a normal impaling plane such as is indicated by the line 36 until the pit passes into the pit receiving recess 35. The flesh of the fruit is halved during this operation by the edges 16 and 17 of the impaling blade, and by rotating the fruit through 90° on the blade 14. The operator then grips the handle 29, causing the cup 32 to be actuated into position to hold the fruit on the impaling blade 14. The knife 10 is caused to rotate by the gear segments 5 engaging the pinions 6 and 7, and as the knife 10 rotates, the impaling blade 14 is caused to travel through an arcuate path to shift the plane of the impaling blade from the position indicated by line 36 in Figure 4 to the positions indicated by the lines 37 and 38, respectively. The impaling blade 14 is shifted so as to keep the pit of the fruit practically in engagement with the curved portion of the pitting knife as the same revolves about the pit, shifting the fruit across the plane in which the fruit passes during the impaling of the fruit, thus forming in the flesh of the fruit a shallow cut.

Having fully described our invention, it is to be understood that we do not wish to be limited to the details herein set forth but our invention is of the full scope of the appended claims.

We claim:

1. A device of the class described including means for halving the fruit, means with said halving means for pitting the fruit, and means for shifting the plane of the halving means during the operation of the pitting means.

2. A device of the class described including an impaling blade on to which the fruit is adapted to be impaled, a rotary pitting knife, means for rotating the pitting knife, and means for moving the impaling blade across the path defined by the fruit when passing onto the impaling blade.

3. A fruit pitter including impaling means upon which the fruit is impaled, a pit removing means, means for actuating the pit removing means, and means for moving the impaling means across the path defined by the fruit as impaled on the impaling means.

4. A fruit pitter including impaling means upon which the fruit is impaled, a pitting knife, means for actuating the pitting knife, and means for moving the impaling means transversely of the plane occupied during the impaling operation by the impaling means.

5. A device of the class described including an impaling blade, a rotary pitting knife, means for rotating the pitting knife, and means operable during the rotation of the pitting knife for moving the impaling means across the normal impaling plane of the impaling means.

6. In a pitting apparatus comprising a curved pitting knife, and driving means journaled for rotation to drive said pitting knife, means for holding said driving means in position and operable to permit said knife being removed through said journal upon removal of the driving means.

7. In a device of the class described, the combination of an impaling blade, a curved pitting knife mounted in a pit receiving recess formed in the impaling blade, operating shafts secured to the curved knife and extending through open slots formed in the impaling blade, and means secured to the shafts for rotating said pitting knife.

8. In a fruit pitter, the combination of a curved pitting knife having an operating shaft, means for rotating the shaft, means for removably securing the rotating means to the shaft, bearing means for the shaft, the pitting knife being removable when the rotating means and bearing means have been released from said shaft.

9. In a fruit pitter, the combination of a curved pitting knife having oppositely extending shafts, means for supporting the shafts, means for removably holding the supporting means for one shaft in position so that on removal of said supporting means the curved pitting knife may be removed.

10. A fruit pitter including a curved pitting knife, means for rotating the curved pitting knife, means for holding the fruit during the rotation of the pitting knife, and means for shifting the holding means relative to the pitting knife to maintain the pit of the fruit near the pitting knife during the complete revolution of the pitting knife.

11. A fruit pitter including an impaling blade, a curved pitting knife, means cooperating with the impaling blade for rotating the pitting knife, and means for shifting the impaling blade through an arcuate path during the rotation of the pitting knife.

12. A fruit pitter including a frame, an impaling blade, means for pivotally securing the impaling blade in the frame, a curved pitting knife, means for rotating the curved pitting knife, and cooperating with said impaling blade for shifting the impaling blade through an arcuate path.

13. In a fruit pitter, the combination of an impaling blade, a curved pitting knife having an operating shaft, means for rotating the shaft, the shaft extending through an open slot formed in the impaling blade, and means for supporting the shaft at its end.

14. A fruit pitter including a curved pitting knife, a pinion releasably secured to one end of the shank of the curved pitting knife, the pinion providing supporting means for the end of the shank, means for locking the pinion to the shaft, and means operatively engaged with the pinion for rotating the same.

15. A fruit pitter including a frame, an impaling blade, a curved pitting knife, the curved pitting knife having an operating shank, bearing means for supporting the end of the shank, a pinion releasably secured to the end of the shank, means operatively engaged with the pinion for rotating the same, and means for locking the pinion in engagement with the end of the shank, said locking means being releasable to permit the pinion and bearing means to be removed so that the curved pitting knife may be withdrawn from the frame.

16. A fruit pitter including a frame, an impaling blade mounted in the frame, a curved pitting knife, the curved pitting knife having a pair of oppositely extending shanks extending through open slots formed in the impaling blade, means for supporting the shanks of the curved pitting knife at their opposite ends, means for rotating the shanks of the curved pitting knife, and means releasably holding the shank supporting means in position and releasable so as to permit the removal of the pitting knife through the frame.

17. A fruit pitter including a frame, an impaling blade, a curved pitting knife having a pair of oppositely extending shanks, a pinion secured to the end of one of said shanks and having an enlarged hub providing supporting means for the end of one of the shanks of the curved pitting knife, the hub fitting into an enlarged bore formed in the frame, means for releasably locking the pinion in position in engagement with the end of the shank of the pitting knife, means operatively engaged with the pinion for rotating the same, and the pinion being removable so as to permit the curved pitting knife to be withdrawn through the enlarged bore occupied by the hub of the pinion.

18. In a fruit pitter, the combination with a curved pitting knife, an impaling blade, means for pivotally supporting the impaling blade, means for rotating the curved pitting knife, said means including an eccentric actuating means adapted to fit within an elongated slot formed in the impaling blade for shifting the impaling blade through an arcuate path as the pitting knife is rotated.

Signed at San Jose, California, this 9 day of September, 1927.

ALBERT R. THOMPSON.

Signed at Los Angeles, this 22 day of September, 1927.

EARL R. ANDERSON.